(12) United States Patent
Nishiyama et al.

(10) Patent No.: US 12,425,714 B2
(45) Date of Patent: Sep. 23, 2025

(54) IMAGING DEVICE, IMAGING METHOD, AND PROGRAM

(71) Applicant: FUJIFILM Corporation, Tokyo (JP)

(72) Inventors: Yukinori Nishiyama, Saitama (JP); Taro Saito, Saitama (JP); Takehiro Koguchi, Saitama (JP); Tomoharu Shimada, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 502 days.

(21) Appl. No.: 17/896,285

(22) Filed: Aug. 26, 2022

(65) Prior Publication Data

US 2022/0417432 A1 Dec. 29, 2022

Related U.S. Application Data

(63) Continuation of application No. PCT/JP2021/006662, filed on Feb. 22, 2021.

(30) Foreign Application Priority Data

Feb. 27, 2020 (JP) ................... 2020-032003

(51) Int. Cl.
*H04N 23/62* (2023.01)
*H04N 23/53* (2023.01)
*H04N 23/63* (2023.01)

(52) U.S. Cl.
CPC ............. *H04N 23/62* (2023.01); *H04N 23/53* (2023.01); *H04N 23/631* (2023.01)

(58) Field of Classification Search
CPC ...... H04N 23/60; H04N 23/62; H04N 23/631; H04N 23/51; H04N 23/53; G03B 5/00; G03B 7/091
See application file for complete search history.

(56) References Cited

U.S. PATENT DOCUMENTS 6,738,095 B2 * 5/2004 Dibella .................. G03B 17/38
 348/222.1
8,676,250 B2 * 3/2014 Tanabe ................... H04N 23/60
 455/556.1

(Continued)

FOREIGN PATENT DOCUMENTS

JP 2006-33724 A 2/2006
JP 2006-41621 A 2/2006

(Continued)

OTHER PUBLICATIONS

International Preliminary Report on Patentability and Written Opinion of the International Searching Authority (Forms PCT/IB/326, PCT/IB/373, and and PCT/ISA/237) for international Application No. PCT/JP2021/006662, dated Sep. 9, 2022, with an English translation.

(Continued)

*Primary Examiner* — Kelly L Jerabek
(74) *Attorney, Agent, or Firm* — Birch, Stewart, Kolasch & Birch, LLP

(57) ABSTRACT

Provided are an imaging device, an imaging method, and a program capable of changing assignment of functions to a plurality of operation units according to a use environment of the imaging device. An imaging device (1) includes: a plurality of operation units (265) provided on a plurality of surfaces of a device main body (101), respectively, and capable of being assigned functions; a memory (267) that stores assignment information indicating a relationship between a use environment and assignment of the functions to the plurality of operation units (265); and a processor (301), in which the processor (301) performs use environment determination processing of determining the use environment of the imaging device, and assignment setting processing of setting the assignment of the functions to the plurality of operation units on the basis of the assignment (Continued)

information of the memory, according to a result of the use environment determination processing.

21 Claims, 11 Drawing Sheets

(56)     References Cited

U.S. PATENT DOCUMENTS

| | | |
|---|---|---|
| 2006/0017694 A1 | 1/2006 | Shikata |
| 2006/0215052 A1 | 9/2006 | Nagaoka et al. |
| 2010/0149398 A1* | 6/2010 | Gayer .................... G03B 17/20 |
| | | 348/E5.022 |
| 2010/0188517 A1 | 7/2010 | Isono |
| 2019/0335094 A1 | 10/2019 | Shoda |
| 2021/0096611 A1* | 4/2021 | Schenone .......... H04N 21/4316 |

FOREIGN PATENT DOCUMENTS

| | | |
|---|---|---|
| JP | 2006-145761 A | 6/2006 |
| JP | 2006-279307 A | 10/2006 |
| JP | 2010-288307 A | 12/2010 |
| JP | 5233997 B2 | 7/2013 |
| JP | 2017-163586 A | 9/2017 |
| JP | 2019-193131 A | 10/2019 |

OTHER PUBLICATIONS

International Search Report (Form PCT/ISA/210) for International Application No. PCT/JP2021/006662, dated May 25, 2021, with an English translation.

* cited by examiner

FIG. 1
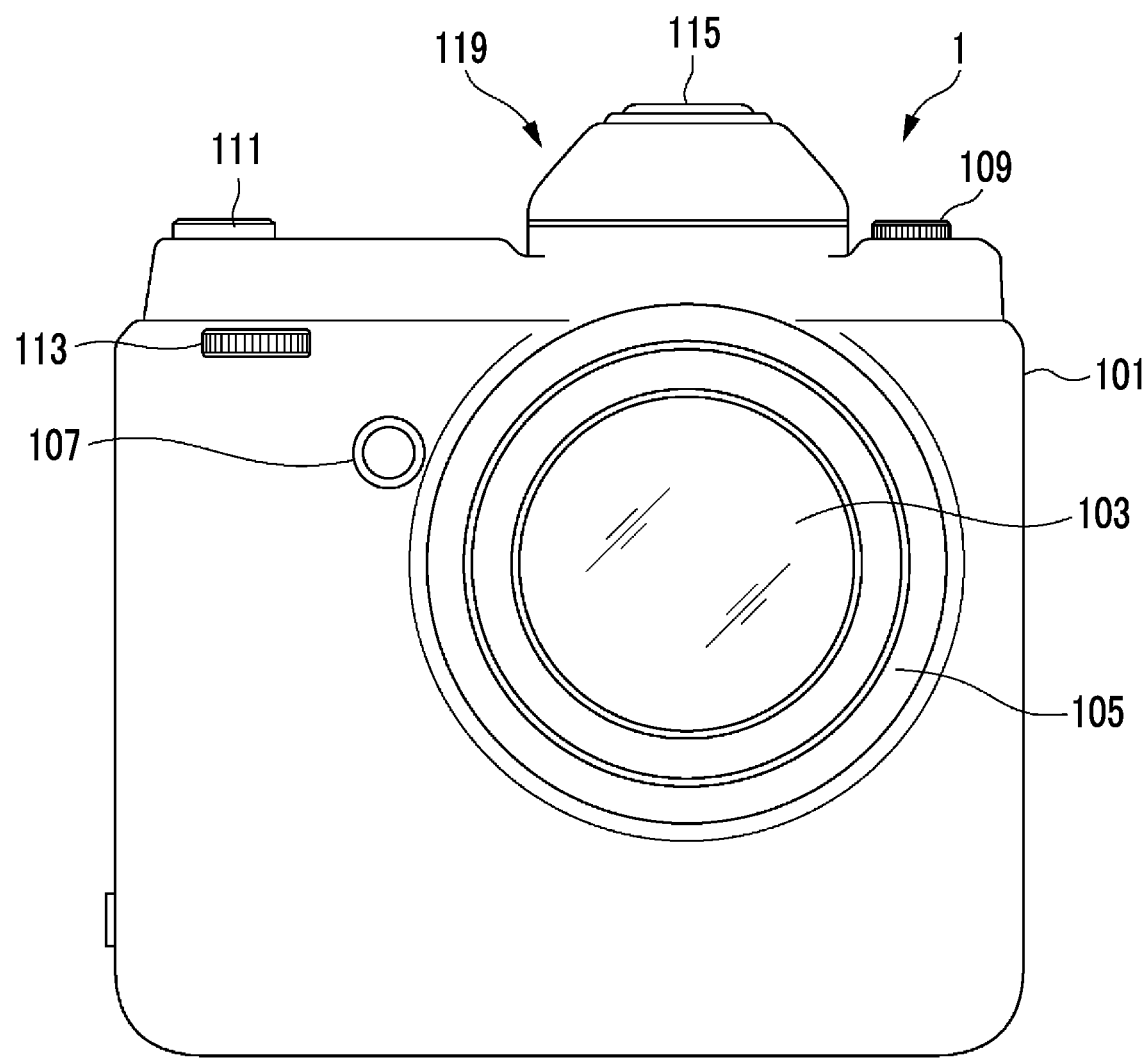
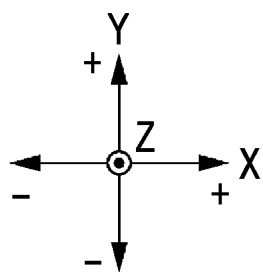

FIG. 3
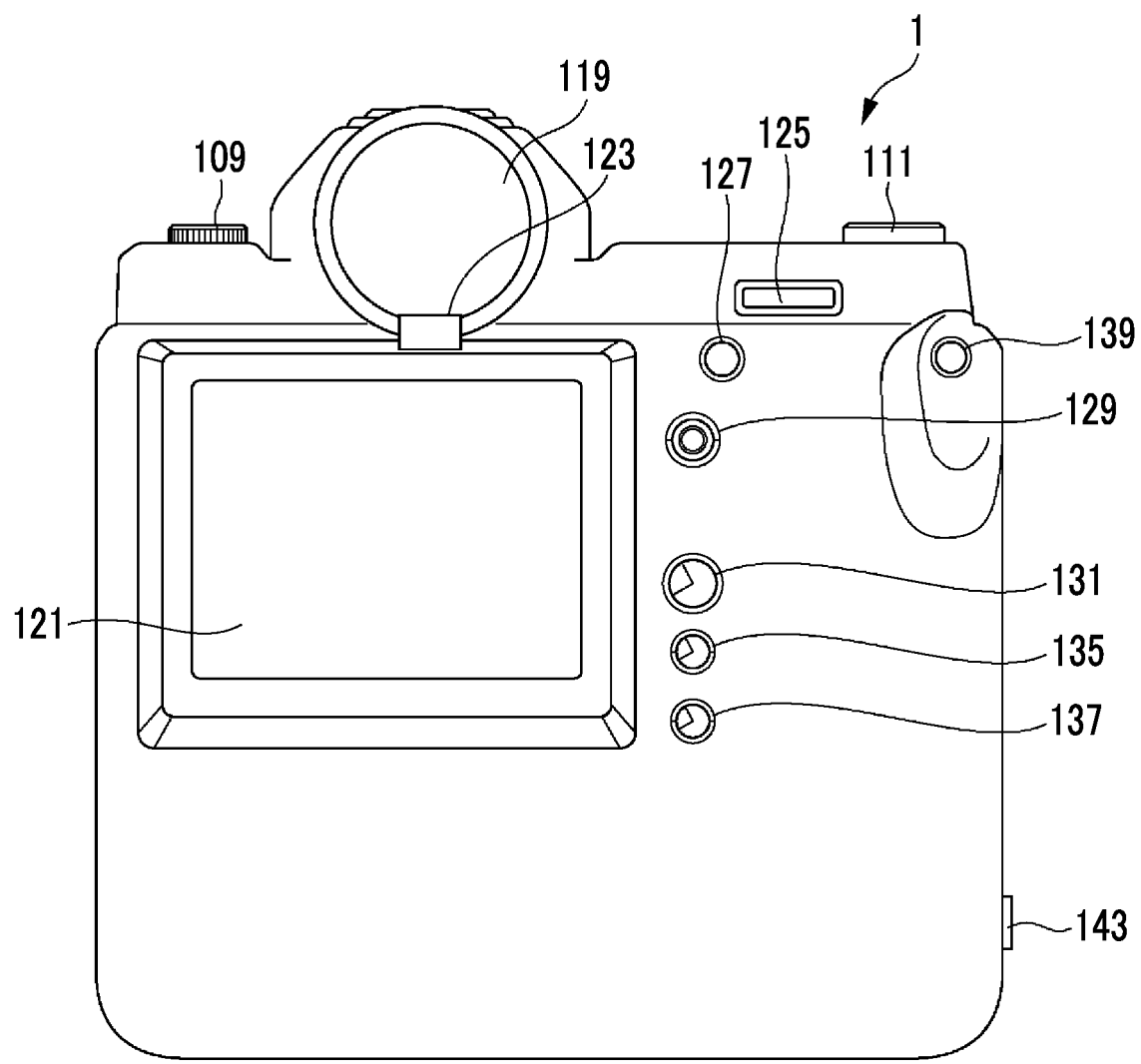
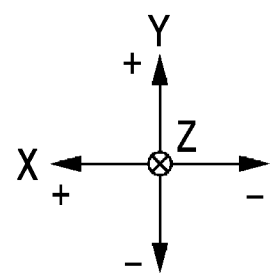

FIG. 8

| USE ENVIRONMENT | STATE OF USE ENVIRONMENT ||| FUNCTION ASSIGNMENT |||||||
|---|---|---|---|---|---|---|---|---|---|
| | HOT SHOE | HDMI MICRO TERMINAL | TILT STATE OF MAIN MONITOR | GYRO SENSOR | FIRST REAR SURFACE FUNCTION BUTTON | SECOND REAR SURFACE FUNCTION BUTTON | SHUTTER BUTTON | UPPER SURFACE DIAL | FRONT DIAL | RIGHT SIDE SURFACE FUNCTION BUTTON |
| No. 1 | NO CONNECTION | NO CONNECTION | NO TILT | NOT TILTED | WHITE BALANCE | MICROPHONE LEVEL SETTING | RECORDING | SHUTTER SPEED | ISO SENSITIVITY | NONE |
| No. 2 | XLR ADAPTER (SMALL) | NO CONNECTION | NO TILT | NOT TILTED | WHITE BALANCE | MICROPHONE LEVEL SETTING | RECORDING | SHUTTER SPEED | ISO SENSITIVITY | NONE |
| No. 3 | XLR ADAPTER (LARGE) | NO CONNECTION | NO TILT | NOT TILTED | WHITE BALANCE | MICROPHONE LEVEL SETTING | RECORDING | ISO SENSITIVITY | RECORDING | NONE |
| No. 4 | XLR ADAPTER (LARGE) | CONNECTED | NO TILT | NOT TILTED | RECORDING | MICROPHONE LEVEL SETTING | RECORDING | WHITE BALANCE | ISO SENSITIVITY | NONE |
| No. 5 | NO CONNECTION | NO CONNECTION | TILTED TO UPPER SURFACE | NOT TILTED | SHUTTER SPEED | MICROPHONE LEVEL SETTING | RECORDING | WHITE BALANCE | ISO SENSITIVITY | NONE |
| No. 6 | XLR ADAPTER (SMALL) | CONNECTED | TILTED TO UPPER SURFACE | NOT TILTED | NONE | NONE | RECORDING | WHITE BALANCE | ISO SENSITIVITY | NONE |
| No. 7 | NO CONNECTION | CONNECTED | NO TILT | ROTATED BY 90° COUNTERCLOCKWISE | WHITE BALANCE | MICROPHONE LEVEL SETTING | NONE | SHUTTER SPEED | ISO SENSITIVITY | RECORDING |
| No. 8 | XLR ADAPTER (LARGE) | CONNECTED | NO TILT | THRESHOLD VALUE α OR LESS | NONE | NONE | RECORDING | SHUTTER SPEED | ISO SENSITIVITY | WHITE BALANCE/ MICROPHONE LEVEL SETTING |

IMAGING DEVICE, IMAGING METHOD, AND PROGRAM

CROSS-REFERENCE TO RELATED APPLICATIONS

The present application is a Continuation of PCT International Application No. PCT/JP2021/006662 filed on Feb. 22, 2021 claiming priority under 35 U.S.C. § 119(a) to Japanese Patent Application No. 2020-032003 filed on Feb. 27, 2020. Each of the above applications is hereby expressly incorporated by reference, in its entirety, into the present application.

BACKGROUND OF THE INVENTION

1. Field of the Invention

The present invention relates to an imaging device, an imaging method, and a program, and particularly to a technique of assigning functions to operation units provided in the imaging device.

2. Description of the Related Art

The imaging device is provided with a plurality of operation units having various functions including a shutter button.

JP2006-33724A discloses a technique of changing functions assigned to an up arrow button, a down arrow button, a left arrow button, and a right arrow button of a cross cursor button provided on a rear surface of an imaging device, according to a rotational orientation of a digital camera.

JP2006-279307A discloses a technique of changing functions assigned to respective arrows constituting a cross key provided in an imaging device, according to a rotation angle of a display unit that is provided in the imaging device and that is rotatable about two axes orthogonal to each other.

SUMMARY OF THE INVENTION

One embodiment according to the technique of the present disclosure provides an imaging device, an imaging method, and a program capable of changing assignment of functions to operation units according to a use environment of the imaging device.

According to an aspect of the present invention, there is provided an imaging device comprising: a plurality of operation units provided on a plurality of surfaces of a device main body, respectively, and capable of being assigned functions; a memory that stores assignment information indicating a relationship between a use environment and assignment of the functions to the plurality of operation units; and a processor, in which the processor performs use environment determination processing of determining the use environment of the imaging device, and assignment setting processing of setting the assignment of the functions to the plurality of operation units on the basis of the assignment information of the memory, according to a result of the use environment determination processing.

Preferably, a motion detection sensor that detects motion of the imaging device is further provided, and the processor performs the use environment determination processing according to a detection result of the motion detection sensor.

Preferably, the operation unit is provided on at least a side surface of the device main body in a case where a surface of the device main body facing an imaging direction is set as a front surface, and the assignment information stored in the memory defines that a function of adjusting an image quality or an imaging condition is assigned to the operation unit provided on the side surface in a case where the detection result of the motion detection sensor is a threshold value or less.

Preferably, an orientation detection sensor that detects an orientation of the imaging device is further provided, and the processor performs the use environment determination processing according to a detection result of the orientation detection sensor.

Preferably, the operation units are provided on at least an upper surface and a side surface of the device main body in a case where a surface of the device main body facing an imaging direction is set as a front surface, and the assignment information stored in the memory defines that a function set to the operation unit provided on the upper surface is transferred to the operation unit provided on the side surface in a case where the orientation detection sensor detects a vertical shooting orientation of the imaging device.

Preferably, in the imaging device, a connection unit through which a signal is input and/or output is further provided, and the processor performs connection detection processing of detecting whether or not connection to the connection unit is performed, and performs the use environment determination processing on the basis of a result of the connection detection processing.

Preferably, the connection unit is a terminal to which an external device is connectable.

Preferably, the operation unit is provided on a front surface, which is a surface of the device main body facing an imaging direction, a first connection unit, which is one of the connection unit, is provided on an upper surface of the device main body, and the assignment information stored in the memory defines that a recording function is assigned to the operation unit provided on the front surface in a case where an external device is connected to the first connection unit.

Preferably, the operation unit is provided on at least a rear surface of the device main body in a case where a surface of the device main body facing an imaging direction is set as a front surface, a second connection unit, which is one of the connection unit, is provided on a side surface of the device main body, and the assignment information stored in the memory defines that a recording function is assigned to the operation unit provided on the rear surface in a case where an external device is connected to the second connection unit.

Preferably, the connection unit is a connection unit using wireless communication.

Preferably, a movable display unit is further provided, and the processor detects a direction of a display screen of the display unit, and performs the use environment determination processing on the basis of the direction of the display screen.

Preferably, the display unit is capable of changing the direction of the display screen in a tilt direction, the operation units are provided on at least a rear surface and an upper surface of the device main body in a case where a surface of the device main body facing an imaging direction is set as a front surface, and the assignment information stored in the memory defines that a function set to the operation unit provided on the rear surface is transferred to the operation unit provided on the upper surface in a case where the display screen faces a direction of the upper surface by a threshold value or more.

Preferably, the display unit is capable of freely changing the direction of the display screen, the operation units are provided on at least a rear surface, an upper surface, a first side surface, and a second side surface of the device main body in a case where a surface of the device main body facing an imaging direction is set as a front surface, the second side surface being provided on a side opposite to the first side surface, and the assignment information stored in the memory defines that a function set to the operation unit provided on the rear surface is transferred to the operation unit provided on the upper surface, the first side surface, or the second side surface, according to the direction of the display screen.

Preferably, the processor causes a display unit provided in the device main body to perform notice display for giving notice that the assignment setting processing is performed.

Preferably, the processor generates and/or edits the assignment information on the basis of an instruction from a user.

According to another aspect of the present invention, there is provided an imaging device comprising: at least one operation unit capable of being assigned a function; a memory that stores assignment information indicating a relationship between a use environment and assignment of the function to the operation unit; a processor; and a connection unit through which a signal is input and/or output, in which the processor performs connection detection processing of detecting whether or not connection to the connection unit is performed, use environment determination processing of determining the use environment of the imaging device on the basis of a result of the connection detection processing, and assignment setting processing of setting the assignment of the function to the operation unit on the basis of the assignment information of the memory, according to a result of the use environment determination processing.

According to still another aspect of the present invention, there is provided an imaging method using an imaging device, which includes a plurality of operation units that are provided on a plurality of surfaces of a device main body, respectively, and that are capable of being assigned functions, a memory that stores assignment information indicating a relationship between a use environment and assignment of the functions to the plurality of operation units, and a processor, the imaging method comprising: a use environment determination processing step of, by the processor, determining the use environment of the imaging device; and an assignment setting processing step of, by the processor, setting the assignment of the functions to the plurality of operation units on the basis of the assignment information of the memory, according to a result of the use environment determination processing step.

According to still another aspect of the present invention, there is provided an imaging method using an imaging device, which includes at least one operation unit capable of being assigned a function, a memory that stores assignment information indicating a relationship between a use environment and assignment of the function to the operation unit, a processor, and a connection unit through which a signal is input and/or output, the imaging method comprising: a connection detection processing step of, by the processor, detecting whether or not connection to the connection unit is performed; a use environment determination processing step of, by the processor, determining the use environment of the imaging device on the basis of a result of the connection detection processing step; and an assignment setting processing step of, by the processor, setting the assignment of the function to the operation unit on the basis of the assignment information of the memory, according to a result of the use environment determination processing step.

According to still another aspect of the present invention, there is provided a program causing an imaging device to execute an imaging method, the imaging device including a plurality of operation units that are provided on a plurality of surfaces of a device main body, respectively, and that are capable of being assigned functions, a memory that stores assignment information indicating a relationship between a use environment and assignment of the functions to the plurality of operation units, and a processor, the imaging method comprising: a use environment determination processing step of, by the processor, determining the use environment of the imaging device; and an assignment setting processing step of, by the processor, setting the assignment of the functions to the plurality of operation units on the basis of the assignment information of the memory, according to a result of the use environment determination processing step.

According to still another aspect of the present invention, there is provided a program causing an imaging device to execute an imaging method, the imaging device including at least one operation unit capable of being assigned a function, a memory that stores assignment information indicating a relationship between a use environment and assignment of the function to the operation unit, a processor, and a connection unit through which a signal is input and/or output, the imaging method comprising: a connection detection processing step of, by the processor, detecting whether or not connection to the connection unit is performed; a use environment determination processing step of, by the processor, determining the use environment of the imaging device on the basis of a result of the connection detection processing step; and an assignment setting processing step of, by the processor, setting the assignment of the function to the operation unit on the basis of the assignment information of the memory, according to a result of the use environment determination processing step.

BRIEF DESCRIPTION OF THE DRAWINGS

FIG. 1 is a front view of an imaging device.
FIG. 3 is a rear view of the imaging device.
FIG. 8 is a diagram showing a storage configuration example of assignment information.

DESCRIPTION OF THE PREFERRED EMBODIMENTS

Hereinafter, a preferred embodiment of an imaging device, an imaging method, and a program according to the embodiment of the present invention will be described with reference to accompanying drawings.

FIGS. 1 to 5 are views showing an interchangeable lens type imaging device which is one embodiment of the present invention. Hereinafter, the interchangeable lens type imaging device will be described. However, the imaging device to which the present invention is applied is not limited to an interchangeable lens type imaging device 1.

Figure 2:
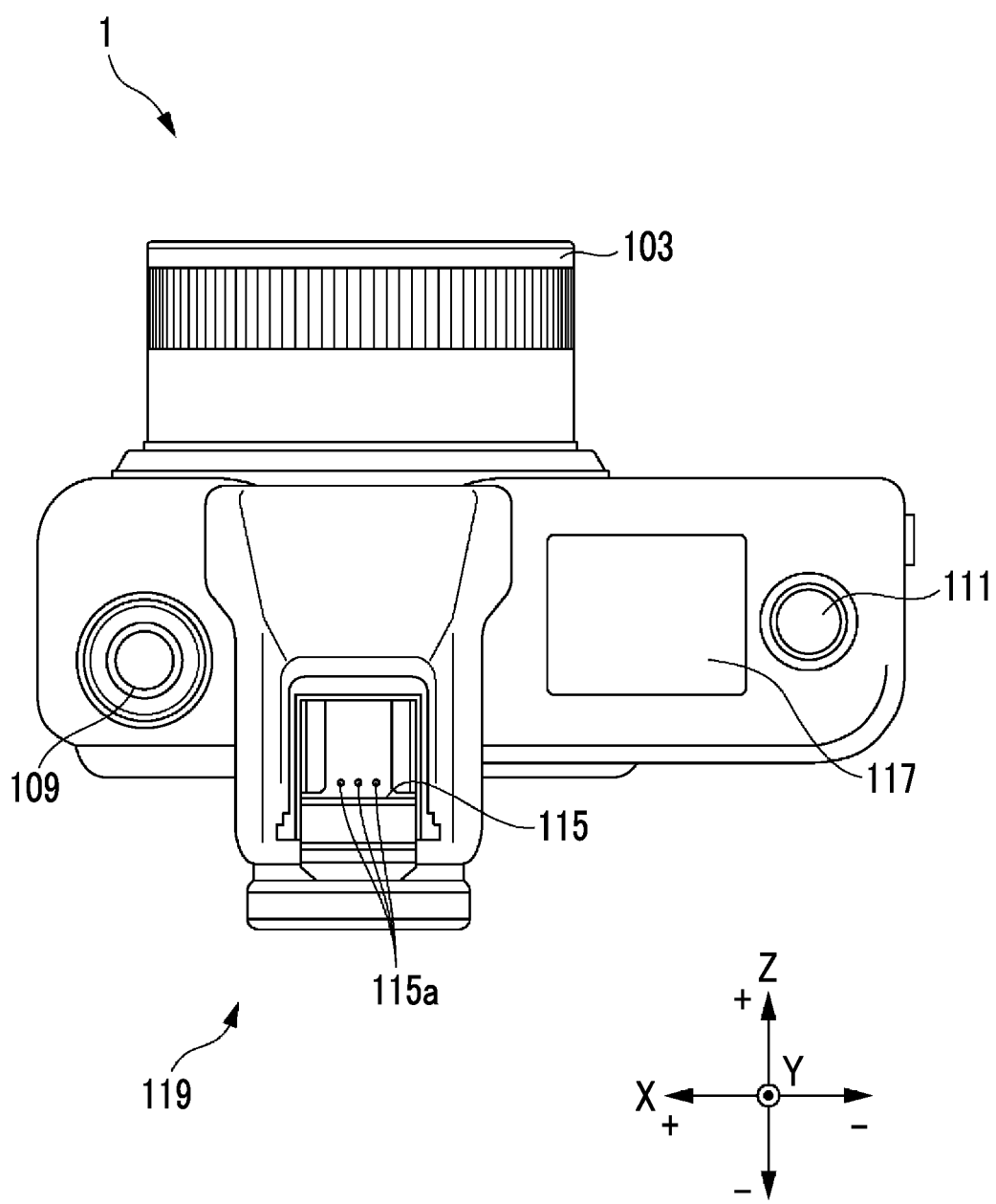
FIG. 2 is a top view of the imaging device.

FIG. 1 is a front view of the imaging device 1, and FIG. 2 is a top view of the imaging device 1. The imaging device 1 is composed of an interchangeable imaging lens 103 and a device main body 101. A lens mount 105 is provided on the front surface of the device main body 101, and an imaging lens 103 is mounted on the device main body 101 via the lens mount 105. A first front surface function button 107 and a front dial 113 are provided on the front surface of the device main body 101, as a part of an operation unit 265 (see FIG. 6). Predetermined functions or functions set by a user are assigned to the first front surface function button 107 and the front dial 113. The imaging lens 103 is mounted on the front surface of the device main body 101, and the front surface of the device main body 101 faces an imaging direction (subject) at the time of imaging.

Figure 6:
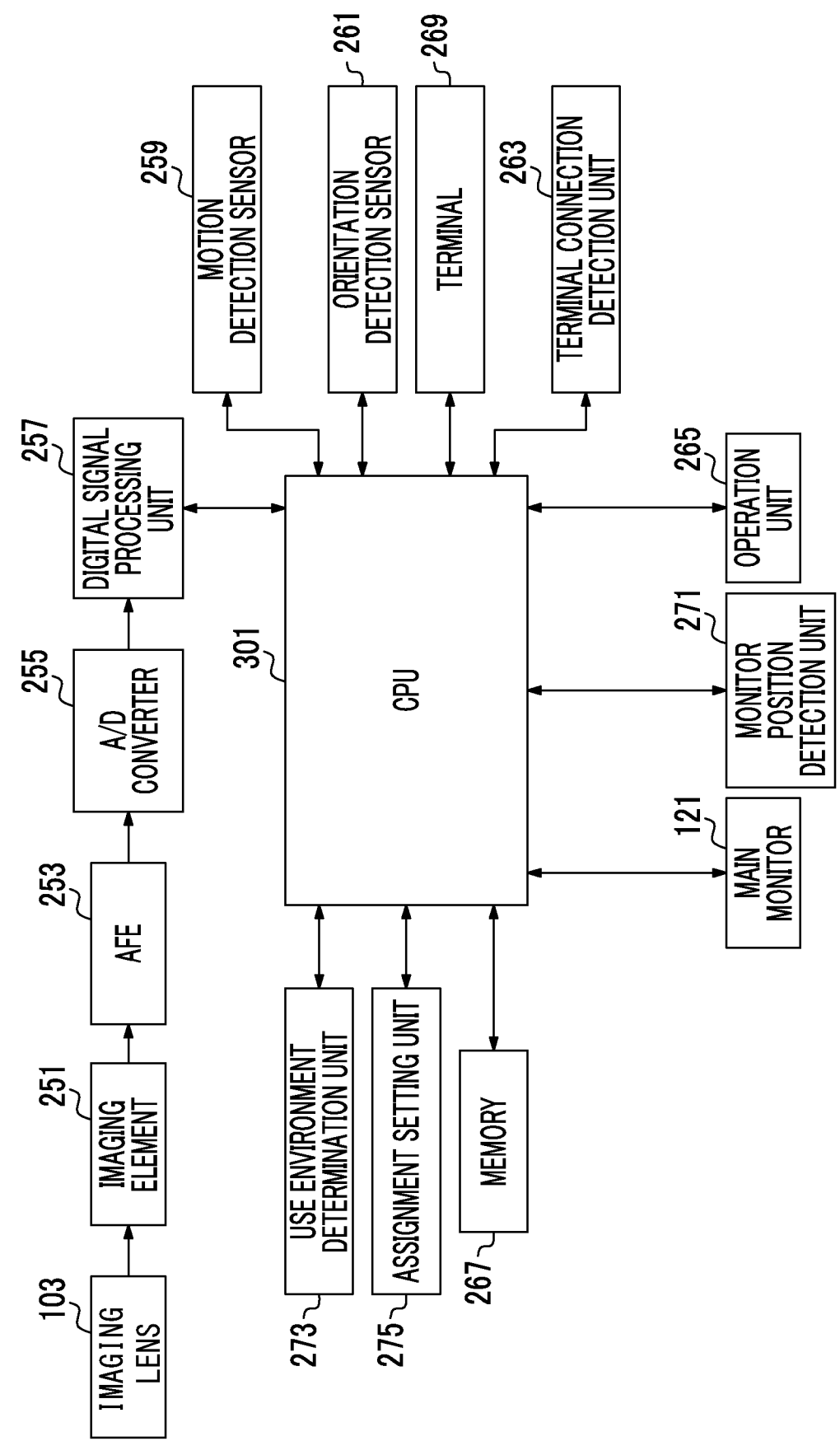
FIG. 6 is a diagram showing a main configuration of the imaging device.

In addition, a shutter button 111 and an upper surface dial 109 are provided on the upper surface of the device main body 101, as a part of the operation unit 265 (see FIG. 6). Further, a sub monitor 117 is provided on the upper surface of the device main body 101. The sub monitor 117 is composed of, for example, a liquid crystal display (LCD). The sub monitor 117 displays main imaging information, such as shutter speed, an F number, sensitivity, and exposure correction. An electronic viewfinder (EVF) 119 is provided on the upper surface of the device main body 101, and a hot shoe 115 is provided on the upper surface of the electronic viewfinder 119. For example, an external flash, an XLR adapter, or the like is mounted on the hot shoe 115. The hot shoe 115 is provided with a hot shoe terminal 115a, and can communicate with a device mounted on the hot shoe 115. Further, a terminal connection detection unit 263 (see FIG. 6) can detect whether or not the device is mounted on the hot shoe 115, the type of the mounted device, and the like, via the hot shoe terminal 115a.

FIG. 3 is a rear view of the imaging device 1.

The rear surface of the device main body 101 of the imaging device 1 is provided with a movable main monitor (display unit) 121. Further, the display of the electronic viewfinder 119 can be seen from the rear surface of the imaging device 1. The rear surface of the device main body 101 is provided with a rear dial 125, a first rear surface function button 127, a second rear surface function button 139, a focus lever 129, a MENU/OK button 131, a display/return button 135, and a playback button 137, as a part of the operation unit 265.

The electronic viewfinder 119 displays a live view, and displays an image captured by an image sensor in real time. The electronic viewfinder 119 can be turned on and off as necessary, and the display thereof can be switched to the display of the main monitor 121. The electronic viewfinder 119 is provided with an eye sensor 123 composed of an object detector, and the eye sensor 123 detects the user's face and the display of the electronic viewfinder 119 is automatically started, in a case where the user (photographer) brings his or her eye close to the electronic viewfinder 119. On the other hand, in a case where the eye sensor 123 does not detect the photographer's face, the display of the electronic viewfinder 119 stops and the display is performed on the main monitor 121.

The main monitor 121 is composed of, for example, an LCD. The main monitor 121 is used as a graphical user interface (GUI) in a case of performing various settings, and is also used as a playback monitor for a captured image. Further, at the time of imaging, a live view is displayed as necessary, and an image captured by the image sensor is displayed in real time.

Predetermined functions or functions set by the user are assigned to the rear dial 125, the first rear surface function button 127, and a second rear surface function button 139. The focus lever 129 is a lever for selecting an auto focus (AF) area. The MENU/OK button 131 is a button for calling a menu screen. In a case where the MENU/OK button 131 is pushed, the menu screen is displayed on the main monitor 121. The menu screen serves as a user interface for performing various settings of the imaging device 1. The display/return button 135 is a button for switching between display contents of the main monitor 121. The playback button 137 is a button for giving an instruction to switch the display mode to a playback mode. In a case where the imaging device 1 is activated in an imaging mode and the playback button 137 is pushed, the display mode is switched to the playback mode.

Figure 4:
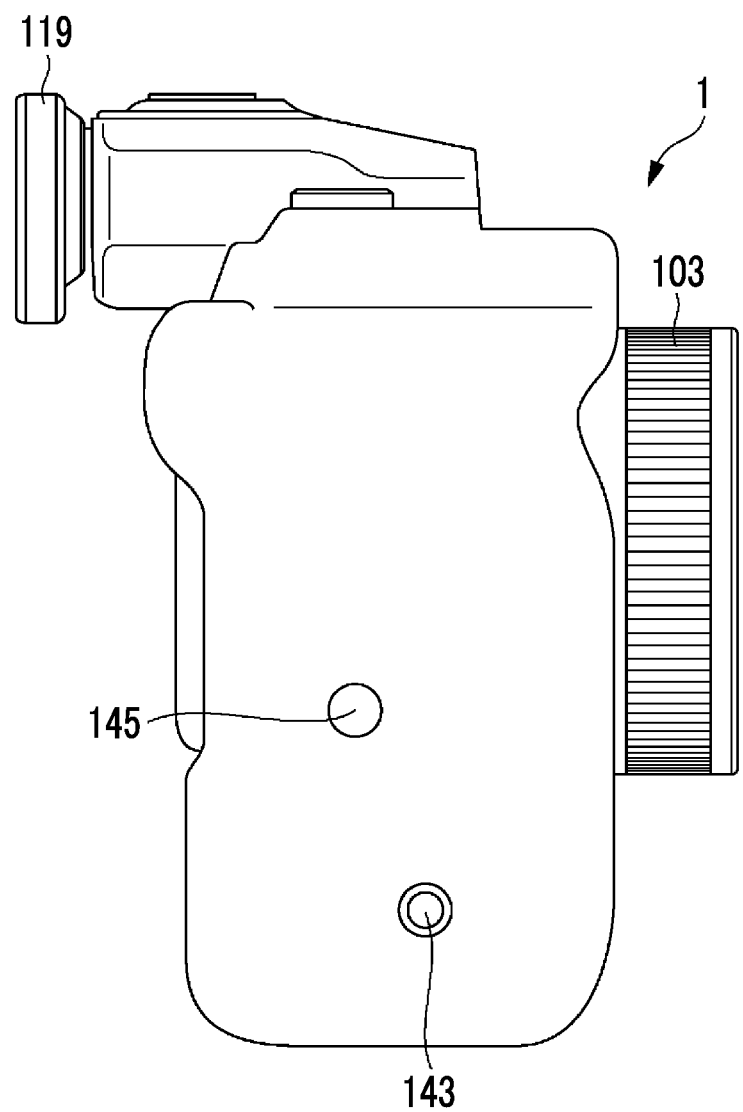
FIG. 4 is a right side view of the imaging device.

FIG. 4 is a right side view of the imaging device 1. A right side surface (first side surface) refers to a side surface of the imaging device 1 positioned on the right hand side of the user in a case where the user takes an imaging posture for a horizontal shooting of the imaging device 1.

A remote release terminal 145 is provided on the right side surface of the device main body 101. In addition, a right side surface function button 143 is provided on the right side surface of the device main body 101, as a part of the operation unit 265. A predetermined function or a function set by the user is assigned to the right side surface function button 143. An external remote release device can be connected to the remote release terminal 145.

Figure 5:
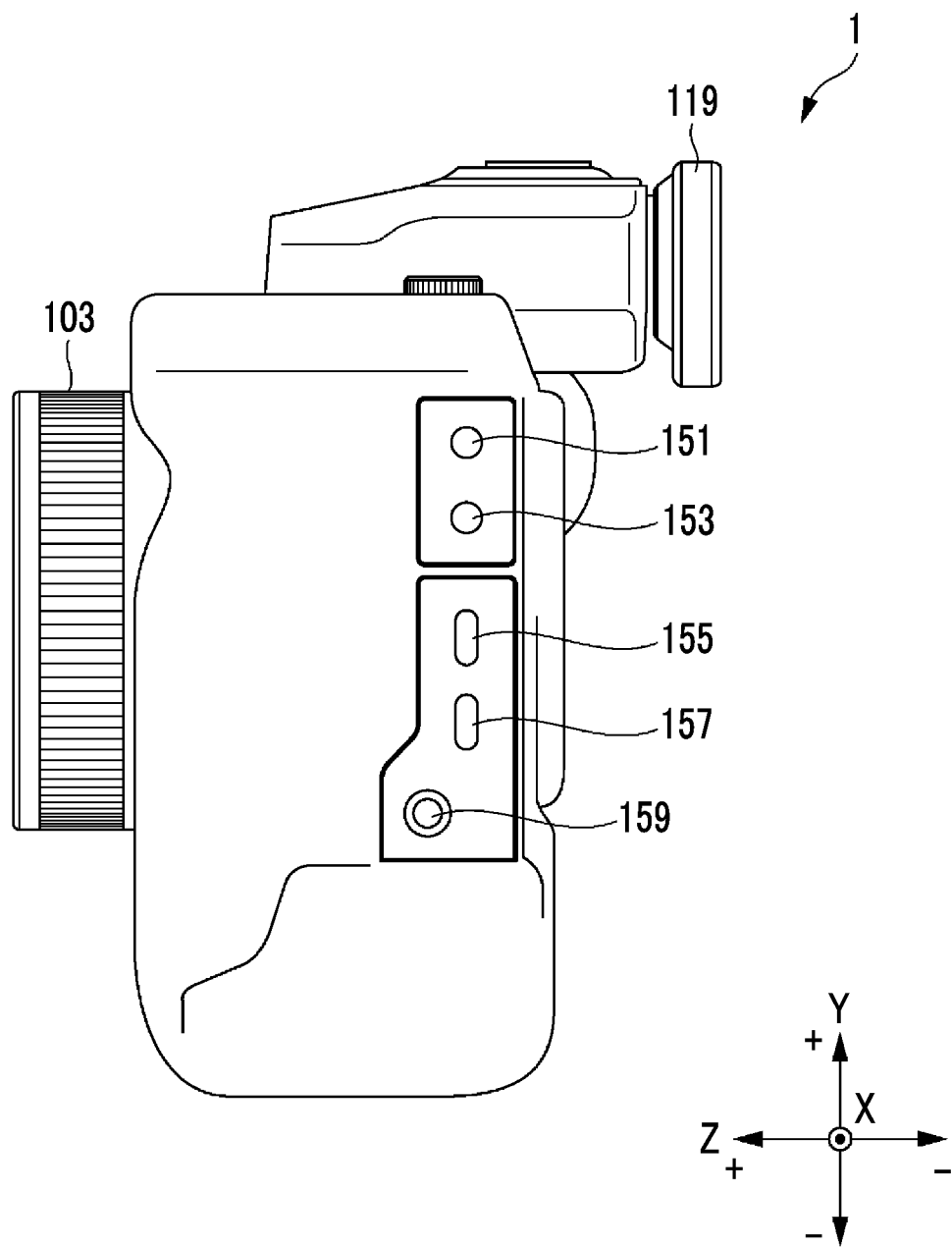
FIG. 5 is a left side view of the imaging device.

FIG. 5 is a left side view of the imaging device 1. The left side surface (second side surface) refers to a side surface of the imaging device 1 positioned on the left hand side of the user in a case where the user takes an imaging posture for a horizontal shooting of the imaging device 1.

The left side surface of the device main body 101 is provided with a microphone terminal 151, a headphone terminal 153, a USB terminal 155, a High-Definition Multimedia Interface (HDMI) (registered trademark) micro terminal 157, and an AC adapter terminal 159. The imaging device 1 is connected to an external microphone via the microphone terminal 151, and is connected to an external headphone via the headphone terminal 153. The imaging device 1 is connected to a computer via the USB terminal 155. The imaging device 1 is connected to, for example, an external monitor via the HDMI micro terminal 157.

FIG. 6 is a diagram showing a main configuration of the imaging device 1. The imaging device 1 has a configuration included in a known imaging device, in addition to the configuration shown in FIG. 6.

The imaging device 1 causes an imaging element 251 to form a subject image (optical image) through the imaging lens 103. The imaging element 251 comprises a light receiving surface in which a large number of light receiving elements are arranged in a matrix form. Light corresponding to the subject image formed on the light receiving surface of the imaging element 251 is received by each light receiving element and converted into an electrical signal. A color filter of red (R), green (G), or blue (B) is provided on the light receiving surface of the imaging element 251, and a color image of the subject can be acquired on the basis of a signal of each color. Various photoelectric conversion elements, such as a complementary metal-oxide semiconductor (CMOS) and a charge-coupled device (CCD), can be used as the imaging element 251. An AFE 253 performs noise removal, amplification, and the like of an analog image signal output from the imaging element 251, and an A/D converter 255 converts the captured analog image signal into a digital image signal with a gradation width. The digital image signal converted by the A/D converter 255 is input to a digital signal processing unit 257. The digital signal processing unit 257 performs gamma correction, color signal separation, white balance adjustment, and the like on the input digital image signal.

A CPU (processor) 301 performs general control of the imaging device 1. The CPU 301 reads out necessary programs and information used to perform various kinds of control, from the memory 267, to perform various kinds of processing and various kinds of control performed by the CPU 301. The memory 267 is an internal memory of the imaging device 1, and stores programs necessary for various kinds of imaging of the imaging device 1. In addition, the memory 267 stores assignment information indicating a relationship between the use environment and the assignment of functions to a plurality of the operation units 265. The assignment information stored in the memory 267 is generated and edited on the basis of an instruction from the user. The assignment information will be described in detail later.

The CPU 301 mainly controls the digital signal processing unit 257, a motion detection sensor 259, an orientation detection sensor 261, a terminal 269, the terminal connection detection unit 263, the operation unit 265, a monitor position detection unit 271, the main monitor 121, the memory 267, an assignment setting unit 275, and a use environment determination unit 273.

The hardware structure of the CPU 301 is various processors as shown below. The various processors include, for example, a central processing unit (CPU) which is a general-purpose processor that executes software (programs) to act as various function units, a programmable logic device (PLD) which is a processor having a changeable circuit configuration after manufacture, such as a field programmable gate array (FPGA), and a dedicated electrical circuit which is a processor having a dedicated circuit configuration designed to execute specific processing, such as an application specific integrated circuit (ASIC).

One function unit may be composed of one of these various processors or may be composed of a combination of two or more processors of the same type or different types (for example, a plurality of FPGAs or a combination of the CPU and the FPGA). Alternatively, the plurality of function units may be composed of one processor. A first example in which the plurality of function units are composed of one processor is an aspect in which one or more CPUs and software are combined to constitute one processor and the processor acts as the plurality of function units, as typified by a computer such as a client or a server. A second example is an aspect in which a processor that realizes all of the functions of a system including the plurality of function units with one integrated circuit (IC) chip is used, as typified by a system on chip (SoC) or the like. As described above, various function units are composed of one or more of the various processors described above as the hardware structure.

The use environment determination unit 273 determines the environment in which the imaging device 1 is used (use environment determination processing). Specifically, the use environment determination unit 273 determines the environment in which the imaging device 1 is used, on the basis of a detection result of at least one of the motion detection sensor 259, the orientation detection sensor 261, the terminal connection detection unit 263, or the monitor position detection unit 271.

The assignment setting unit 275 sets the assignment of the functions to the plurality of operation units 265 on the basis of the assignment information stored in the memory 267, according to the result of the use environment determination processing performed by the use environment determination unit 273.

The motion detection sensor 259 detects the motion of the imaging device 1. The use environment determination unit 273 determines the use environment of the imaging device 1 according to the detection result of the motion detection sensor 259. The motion detection sensor 259 is composed of a known sensor capable of detecting the motion of the imaging device 1.

The orientation detection sensor 261 detects the orientation of the imaging device 1. The use environment determination unit 273 determines the use environment of the imaging device 1 according to the detection result of the orientation detection sensor 261. The orientation detection sensor 261 is composed of a known sensor capable of detecting the orientation of the imaging device 1.

The terminal connection detection unit 263 can detect whether or not the connection to the terminal (connection unit) 269 of the imaging device 1 is performed (connection detection processing). Further, in a case where the terminal connection detection unit 263 can communicate with an external device connected to the terminal 269, the terminal connection detection unit 263 can also detect the type of the connected device and the like. For example, the terminal connection detection unit 263 communicates with the hot shoe terminal 115a and the external device mounted on the hot shoe 115, to detect the connection of the external device to the hot shoe 115 and specify the mounted external device. The terminal 269 is a general term for various terminals described with reference to FIGS. 1 to 5, and is connected to the CPU 301. Specifically, the terminal 269 of the imaging device 1 includes the hot shoe 115, the hot shoe terminal 115a, the remote release terminal 145, the microphone terminal 151, the headphone terminal 153, the USB terminal 155, the HDMI micro terminal 157, and the AC adapter terminal 159. Although not shown, the terminal 269 also includes a connection unit (for example, Wi-fi (registered trademark) or Bluetooth (registered trademark)) through which connection to the external device is performed by wireless communication.

The monitor position detection unit 271 detects the position of the main monitor 121. Specifically, the monitor position detection unit 271 detects a direction that the display screen of the main monitor 121 faces. The main monitor 121 displays a live view image and the menu screen on the display screen as described above under the control of the CPU 301. Further, the above-mentioned sub monitor 117 and electronic viewfinder 119 also perform display under the control of the CPU 301, but the illustration in FIG. 6 is omitted.

The operation unit 265 is a general term for the above-mentioned operation units of the imaging device 1, and is connected to the CPU 301. Specifically, the operation unit 265 includes the first front surface function button 107, the front dial 113, the shutter button 111, the upper surface dial 109, the rear dial 125, the first rear surface function button 127, the second rear surface function button 139, the focus lever 129, the MENU/OK button 131, the display/return button 135, the playback button 137, and the right side surface function button 143. Further, the function assigned to the operation unit 265 can be changed by the assignment setting unit 275.

Next, an imaging method (a program for executing the imaging method) using the imaging device 1 will be described.

Figure 7:
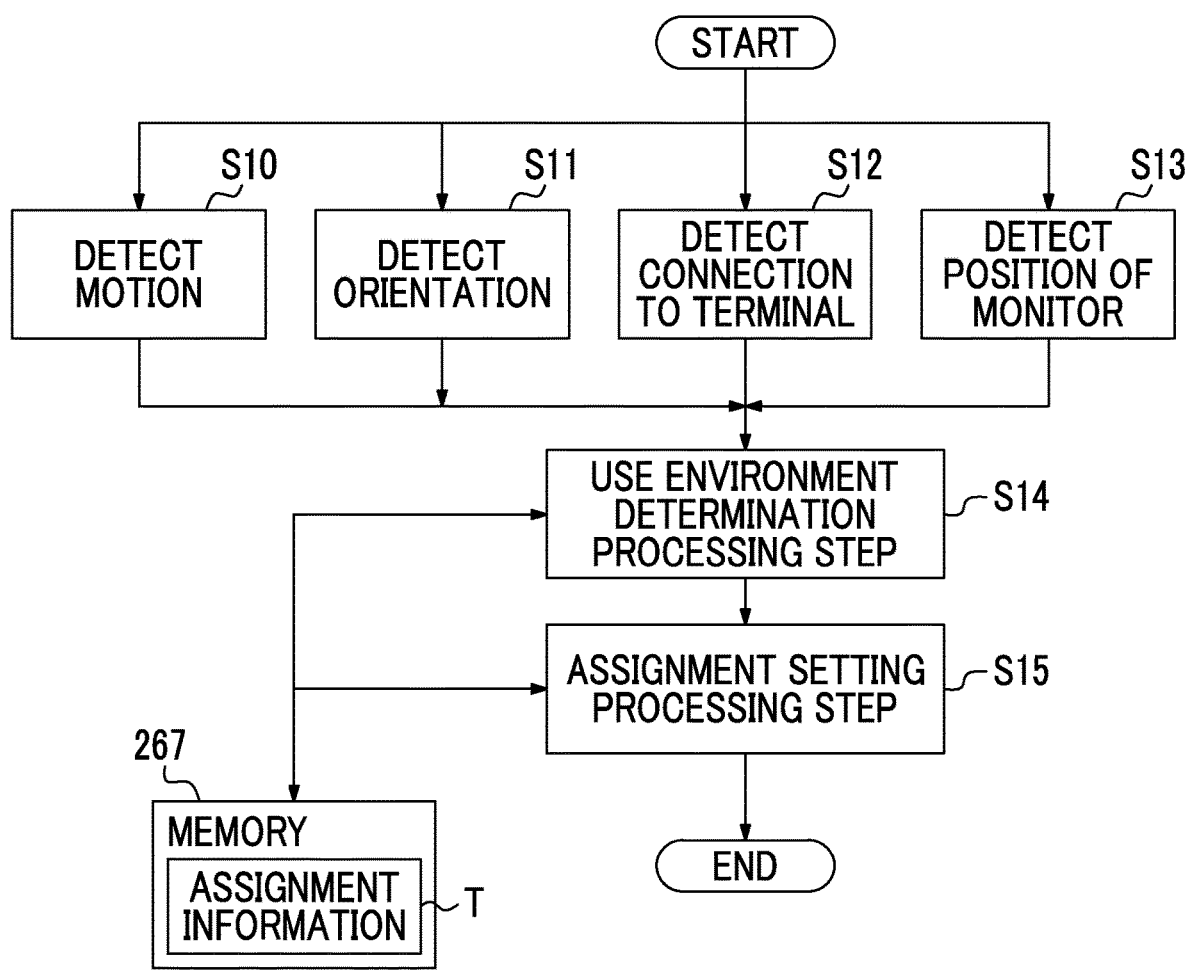
FIG. 7 is a flowchart illustrating an imaging method.

FIG. 7 is a flowchart illustrating the imaging method.

First, the motion of the imaging device 1 is detected by the motion detection sensor 259 (motion detection step: step S10). Alternatively, the orientation of the imaging device 1 is detected by the orientation detection sensor 261 (orientation detection step: step S11). Alternatively, the connection state to the terminal 269 of the imaging device 1 is detected by the terminal connection detection unit 263 (connection detection processing step: step S12). Alternatively, the direction of the display screen of the main monitor 121 is detected by the monitor position detection unit 271 (monitor position detection step: step S13). The use environment determination unit 273 can determine the use environment on the basis of at least one of the detection result of the motion detection sensor 259 (step S10), the detection result of the orientation detection sensor 261 (step S11), the detection result of the terminal connection detection unit 263 (step S12), or the detection result of the monitor position detection unit 271 (step S13).

Next, a use environment determination processing step (step S14) is performed by the use environment determination unit 273. The use environment determination unit 273 determines which use environment, out of the use environments defined in assignment information T stored in the memory 267, the detected use environment corresponds to, on the basis of the acquired various detection results.

Next, an assignment setting processing step is performed by the assignment setting unit 275 (step S15). The assignment setting unit 275 sets the assignment of the functions to the operation units 265 on the basis of the assignment information T stored in the memory 267, according to the result of the use environment determination processing.

Each of the above-mentioned configurations and functions can be appropriately realized by any hardware, software, or a combination of both. For example, the present invention can be applied to a program causing a computer to execute the above-mentioned processing steps (processing procedures), a computer-readable recording medium (non-transitory recording medium) on which such a program is recorded, or a computer on which such a program can be installed.

Next, a specific example of the assignment information T will be described.

FIG. 8 is a diagram showing a storage configuration example of the assignment information T stored in the memory 267. In the example shown in FIG. 8, the use environment determination unit 273 determines which use environment, out of use environments No. 1 to No. 8, the detected use environment corresponds to, on the basis of the connection to the hot shoe (first connection unit) 115 detected by the terminal connection detection unit 263, the connection to the HDMI micro terminal (second connection unit) 157, the tilt state of the main monitor 121 detected by the monitor position detection unit 271, and the detection result of a gyro sensor functioning as the orientation detection sensor 261 and the motion detection sensor 259. Then, the assignment setting unit 275 assigns the functions to the first rear surface function button 127, the second rear surface function button 139, the shutter button 111, the upper surface dial 109, the front dial 113, and the right side surface function button 143, as the operation unit 265 of the imaging device 1. Further, the assignment information T defines the assignment of the functions to the operation units 265 in a motion picture imaging mode of the imaging device 1.

<Use Environment No. 1>

The use environment determination unit 273 determines the use environment No. 1, in a case where there is no connection to the hot shoe 115 or HDMI micro terminal 157, there is no tilt of the main monitor 121, and the gyro sensor does not detect a rotation state. The use environment No. 1 is a normal use environment of the imaging device 1.

In a case where the use environment determination unit 273 determines the use environment No. 1, the assignment setting unit 275 assigns a white balance setting function to the first rear surface function button 127, a microphone level setting function to the second rear surface function button 139, a recording function to the shutter button 111, a shutter speed setting function to the upper surface dial 109, and an ISO sensitivity setting function to the front dial 113. Further, the assignment setting unit 275 does not assign a function to the right side surface function button 143.

In this way, various functions are assigned to the operation units 265, so that high operability can be realized in a case where the imaging device 1 is normally used.

<Use Environment No. 2>

The use environment determination unit 273 determines the use environment No. 2, in a case where the terminal connection detection unit 263 detects that a small type XLR adapter is connected to the hot shoe 115 as compared with the use environment No. 1. In the following description, differences from the use environment No. 1 will be mainly described.

In a case where the use environment determination unit 273 determines the use environment No. 2, the assignment setting unit 275 assigns the functions to the operation units 265 in the same manner as the use environment No. 1. Specifically, the assignment setting unit 275 assigns the white balance setting function to the first rear surface function button 127, the microphone level setting function to the second rear surface function button 139, the recording function to the shutter button 111, the shutter speed setting function to the upper surface dial 109, and the ISO sensitivity setting function to the front dial 113, and does not assign a function to the right side surface function button 143. In the use environment No. 2, the small XLR adapter is connected to the hot shoe 115, and the small XLR adapter does not obstruct the operation. Therefore, the assignment setting unit 275 assigns the functions to the operation units 265 in the same manner as the use environment No. 1.

<Use Environment No. 3>

The use environment determination unit 273 determines the use environment No. 3, in a case where the terminal connection detection unit 263 detects that a large type XLR adapter is connected to the hot shoe 115.

In the use environment No. 3, since the large XLR adapter is connected to the hot shoe 115, the shutter button 111 and the upper surface dial 109 provided on the upper surface of the device main body 101 become the difficult-to-operate operation units 265. Therefore, in a case where the use environment determination unit 273 determines the use environment No. 3, the assignment setting unit 275 assigns the recording function, which is frequently used, to the front dial 113 provided on the front surface of the device main body 101. Further, the assignment setting unit 275 assigns the ISO sensitivity setting function, in place of the shutter speed setting function, to the upper surface dial 109 because the shutter speed setting is relatively infrequently changed once the shutter speed setting is set in a case of motion picture imaging.

In this way, it is possible to perform imaging without deteriorating the operability by preferentially assigning the function, which is frequently used, to the operation unit 265 of which the operability does not deteriorate, even in a case where the large XLR adapter is mounted on the upper surface of the device main body 101 and the operation to the operation unit 265 provided on the upper surface of the device main body 101 is obstructed.

<Use Environment No. 4>

The use environment determination unit 273 determines the use environment No. 4, in a case where the terminal connection detection unit 263 detects that a large XLR adapter is connected to the hot shoe 115 and also detects the connection to the HDMI micro terminal 157.

In the use environment No. 4, since the large XLR adapter is connected to the hot shoe 115, the shutter button 111 and the upper surface dial 109 provided on the upper surface of the device main body 101 become the difficult-to-operate operation units 265. Further, in the use environment No. 4, since the HDMI micro terminal 157 is connected and an external monitor is mounted on the left side surface of the device main body 101, the operability of the operation unit 265 on the left side portion of the device main body 101 also deteriorates. Therefore, the assignment setting unit 275 assigns the recording function to the first rear surface function button 127 in a case where the use environment determination unit 273 determines the use environment No. 4. Further, the assignment setting unit 275 assigns the white balance adjustment function to the upper surface dial 109. Since the shutter speed is not changed during motion picture imaging once the shutter speed is decided in a case of the motion picture imaging, the white balance adjustment function assigned to the first rear surface function button 127 is assigned to the upper surface dial 109.

In this way, it is possible to perform imaging without deteriorating the operability by changing the assignment of the function to the operation unit 265 as described above, even in a case where the large XLR adapter is mounted on the upper surface of the device main body 101, the external monitor is mounted on the left side surface of the device main body 101, and the operation to the operation units 265 provided on the upper surface and the left side of the device main body 101 is obstructed.

<Use Environment No. 5>

Figure 9:
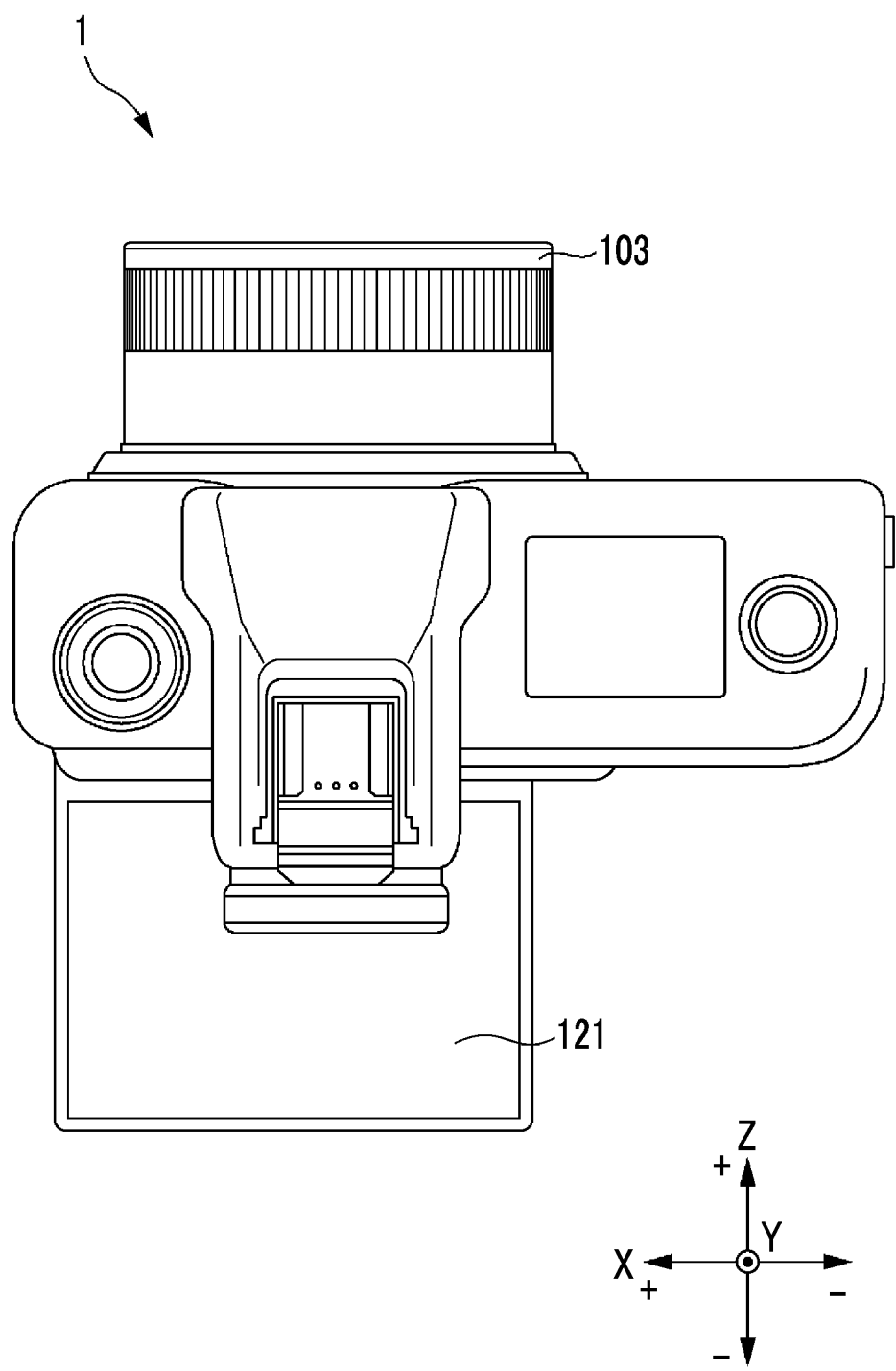
FIG. 9 is a view illustrating a use environment No. 5 of the imaging device.

FIG. 9 is a view illustrating the use environment No. 5 of the imaging device 1.

As shown in FIG. 9, in the use environment No. 5, the imaging device 1 is used with the display screen of the main monitor 121 facing the same direction as the upper surface of the imaging device 1, and the imaging device 1 is used for a so-called low-angle shot. In this case, the use environment determination unit 273 determines the use environment No. 5 in a case where the monitor position detection unit 271 detects the tilt of the main monitor 121 to the upper surface. Here, for example, in a case where the monitor position detection unit 271 detects that the main monitor 121 faces the upper surface by a threshold value β or more, the use environment determination unit 273 determines the use environment No. 5.

In the use environment No. 5, it is considered that the user looks at the imaging device 1 from the upper surface of the imaging device 1 from the fact that the main monitor 121 is tilted to the upper surface of the imaging device 1, and in that case, the operability of the upper surface of the imaging device 1 is increased. Therefore, the assignment setting unit 275 preferentially assigns the function, which is frequently used, to the upper surface of the device main body 101. Specifically, the assignment setting unit 275 assigns the white balance adjustment function assigned to the first rear surface function button 127 to the upper surface dial 109, and assigns the shutter speed adjustment function assigned to the upper surface dial 109 to the first rear surface function button 127.

In this way, it is possible to prevent the operability from deteriorating by preferentially assigning the function, which is frequently used, to the upper surface of the device main body 101, in a case where it is considered that the user looks at the imaging device 1 from the upper surface of the imaging device 1 because the main monitor 121 is tilted to the upper surface of the imaging device 1.

<Use Environment No. 6>

The use environment determination unit 273 determines the use environment No. 6, in a case where the terminal connection detection unit 263 detects that a small XLR adapter is connected to the hot shoe 115 and also detects the connection to the HDMI micro terminal 157, and the monitor position detection unit 271 detects the tilt of the main monitor 121 to the upper surface.

In the use environment No. 6, the small XLR adapter is connected to the hot shoe 115, the HDMI micro terminal 157 is connected, and an external monitor is mounted on the left side surface of the imaging device 1. Further, it is considered that the user looks at the imaging device 1 from the upper surface of the imaging device 1 from the fact that the main monitor 121 faces the upper surface of the imaging device 1. In this case, the operability of the rear surface of the device main body 101 deteriorates. Therefore, the assignment setting unit 275 preferentially assigns the function, which is frequently used, to the upper surface of the device main body 101. Specifically, the assignment setting unit 275 assigns the white balance adjustment function assigned to the first rear surface function button 127 to the upper surface dial 109. Further, the assignment setting unit 275 does not assign functions to the first rear surface function button 127 and the second rear surface function button 139 of which the operability may deteriorate in the use environment No. 6.

In this way, it is possible to prevent the operability from deteriorating by avoiding assigning the functions to the first rear surface function button 127 and the second rear surface function button 139 of which the operability deteriorates and by preferentially assigning the function, which is frequently used, to the upper surface of the device main body 101, even in a case where the small XLR adapter is connected to the hot shoe 115, the HDMI micro terminal 157 is connected, and the external monitor is mounted on the left side surface of the imaging device 1.

<Use Environment No. 7>

Figure 10:
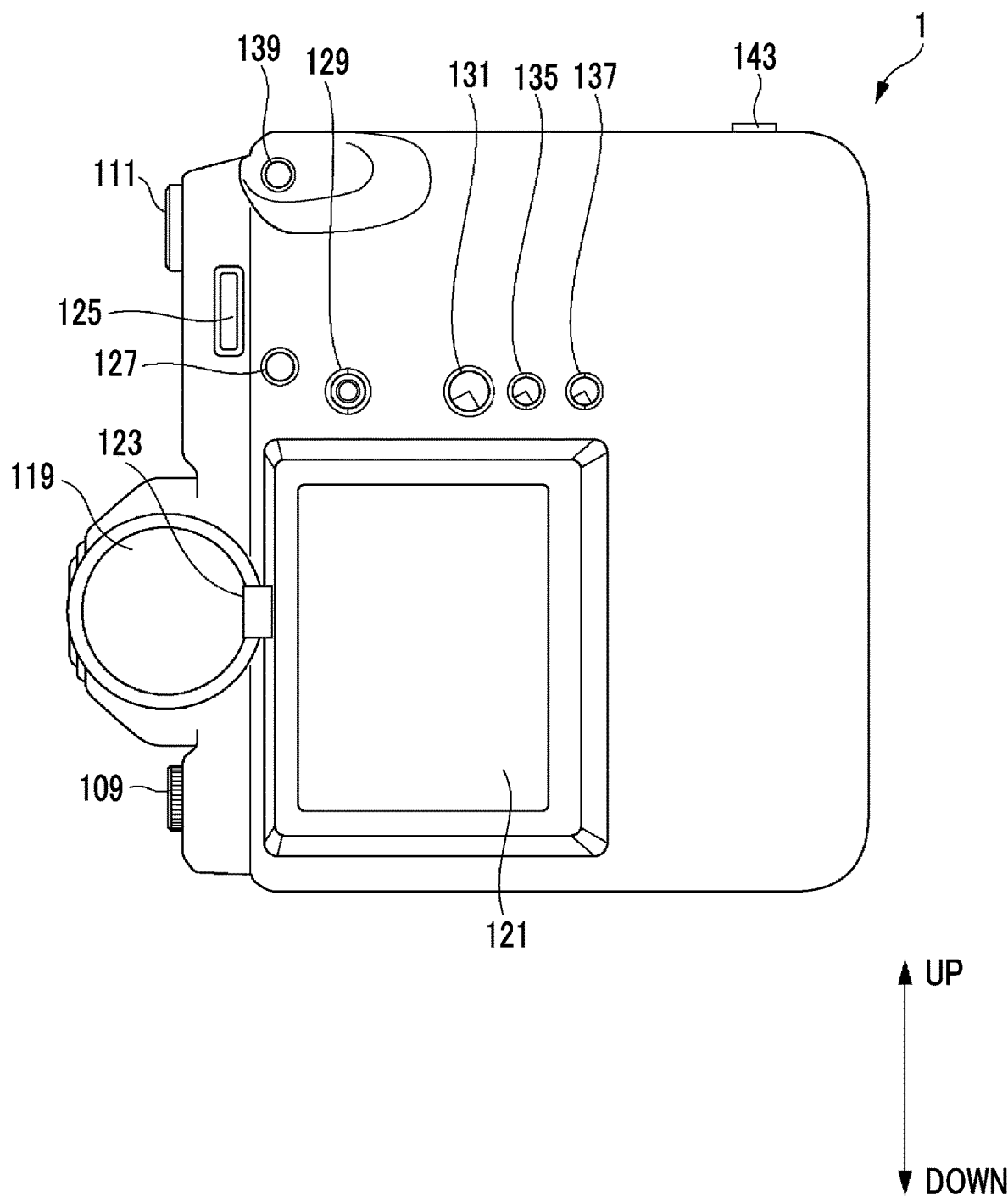
FIG. 10 is a view illustrating a use environment No. 7 of the imaging device.

FIG. 10 is a view illustrating the use environment No. 7 of the imaging device 1. FIG. 10 shows vertically up and down directions.

As shown in FIG. 10, in the use environment No. 7, vertical shooting is performed using the imaging device 1. In this case, in a case where the gyro sensor detects that the imaging device 1 is rotated by 90° counterclockwise from a case of horizontal shooting (see FIGS. 1 and 3), the use environment determination unit 273 determines the use environment No. 7 (vertical shooting). In vertical shooting, as shown in FIG. 10, the right side surface of the device main body 101 is located vertically upward, and the left side surface is located vertically downward.

In the use environment No. 7, as shown in FIG. 10, imaging is performed in a state in which the device main body 101 is rotated by 90°. Therefore, the assignment setting unit 275 assigns the recording function assigned to the shutter button 111 in a case of horizontal shooting to the right side surface function button 143 located at the same location of the device main body 101 in a case of vertical shooting.

In this way, it is possible to prevent the operability from deteriorating by assigning the recording function assigned to the shutter button 111 to the right side surface function button 143, even in a case where vertical shooting is performed by the imaging device 1.

<Use Environment No. 8>

Figure 11:
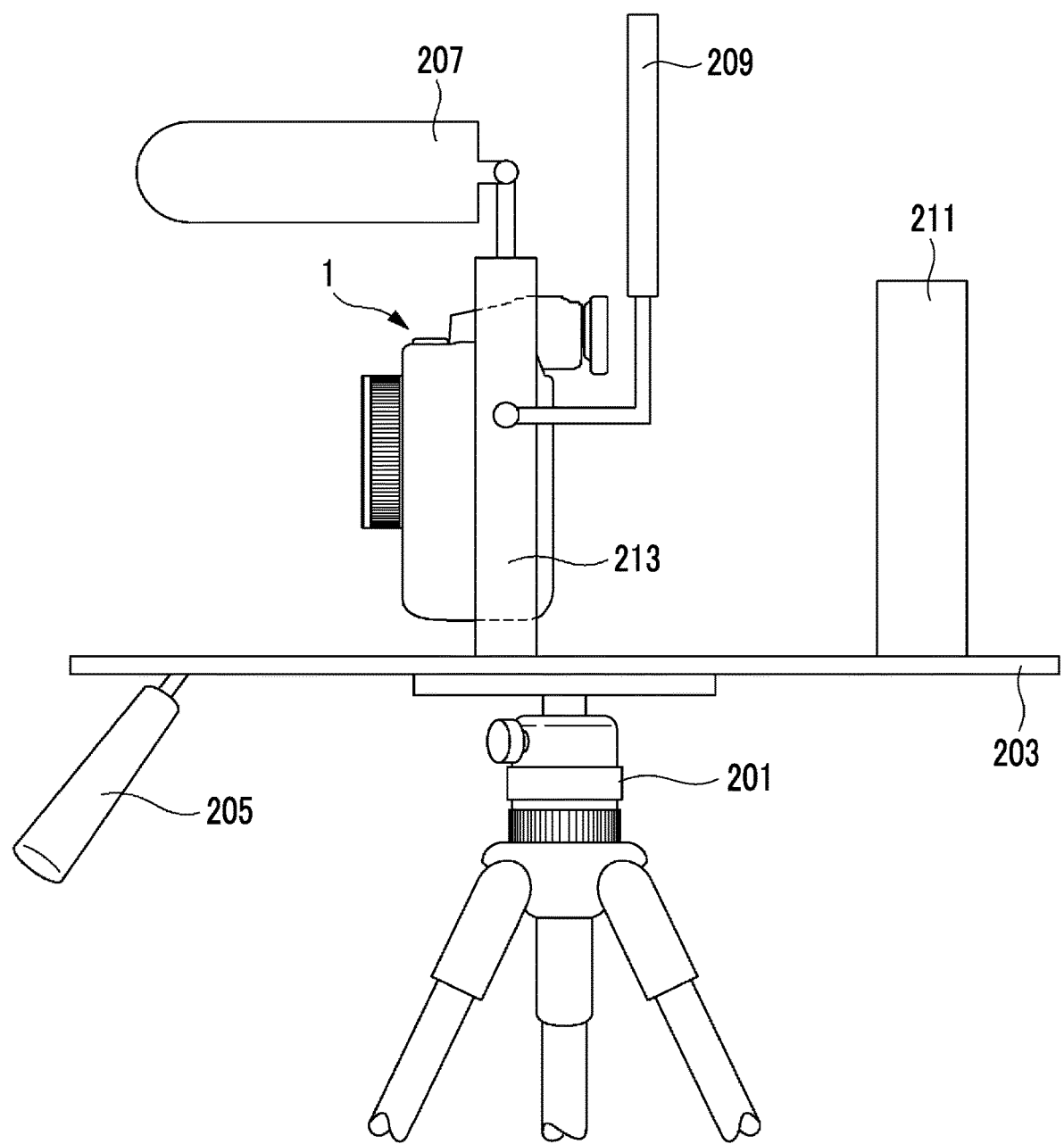
FIG. 11 is a view illustrating a use environment No. 8 of the imaging device.

FIG. 11 is a view illustrating the use environment No. 8 of the imaging device 1.

As shown in FIG. 11, in the use environment No. 8, the imaging device 1 is fixed to a tripod 201 and a rig is assembled. A cage 213 is attached to the imaging device 1, and an external device is attached to the cage 213. Specifically, a gun microphone 207 and an external monitor 209 are attached to the cage 213. The gun microphone 207 is connected to the imaging device 1 through a large XLR adapter mounted on the hot shoe 115. Further, the external monitor 209 is connected to the imaging device 1 via the HDMI micro terminal 157. A lot 203 is attached to the cage 213, and a handle 205 is attached to the lot 203. An external battery 211 is attached to the lot 203 behind the imaging device 1. Here, the rig is composed of the cage 213, the lot 203, and the handle 205, and the rig is assembled, so that it is possible to perform imaging in which camera shake and the like are restrained. In a case where the imaging device 1 is fixed to the tripod 201, vibration is restrained and a value detected by the gyro sensor becomes small. Therefore, in a case where the value of the gyro sensor is a threshold value α or less, the use environment determination unit 273 determines the use environment No. 8. The threshold value α is a value appropriately determined according to the use environment of the imaging device 1. Alternatively, a period t may be set and the use environment determination unit 273 may determine the use environment No. 8 in a case where the value of the gyro sensor is the threshold value α or less in the period t.

In the use environment No. 8, since the external battery 211 and the external monitor 209 are attached to the rear side of the imaging device 1 (see FIG. 11), the operability of the rear surface of the device main body 101 deteriorates. Therefore, the assignment setting unit 275 does not assign functions to the first rear surface function button 127 and the second rear surface function button 139. On the other hand, since the external device is not attached to the side surface of the device main body 101, the operability thereof does not deteriorate. Therefore, the assignment setting unit 275 assigns the white balance setting function and the microphone level setting function to the right side surface function button 143. The right side surface function button 143 is pressed once to have the white balance setting function, and is consecutively pressed twice to have the microphone level setting function.

In this way, in a case where imaging is performed in a state in which the imaging device 1 is fixed to the tripod 201 and the rig is assembled, no functions are assigned to the first rear surface function button 127 and the second rear surface function button 139, and a function of adjusting an image quality or imaging conditions (for example, white balance) and the microphone level setting function are assigned to the right side surface function button 143. With this, it is possible to prevent the operability of the imaging device 1 from deteriorating.

As described above, in the assignment information T, the functions are assigned to the first rear surface function button 127, the second rear surface function button 139, the shutter button 111, the upper surface dial 109, the front dial 113, and the right side surface function button 143 so that the operability does not deteriorate in motion picture imaging for each of the use environments No. 1 to No. 8 of the imaging device 1.

The above-mentioned assignment information T is an example, and the assignment information T may define the assignment of functions to the operation units 265 through another use environment and another aspect.

<Others>

In the description of FIG. 9, the case where the main monitor 121 of the imaging device 1 is tilted has been described, but the present invention is also applied to, for example, a case where the direction of the main monitor 121 of the imaging device 1 can be freely changed. In that case, the operation units 265 are provided on the front surface, the upper surface, the rear surface, the right side surface, and the left side surface of the device main body 101, and the function is transferred to the operation unit provided on the same surface as a surface that the display screen of the main monitor 121 faces. For example, in a case where the white balance adjustment function is assigned to the first rear surface function button 127 as an initial state (the display screen of the main monitor 121 faces the rear surface direction), the white balance adjustment function is transferred to the first front surface function button 107 when the main monitor 121 faces the front surface of the device main body 101. With this, the user can adjust the white balance while looking at the display of the main monitor 121 (for example, live view display).

The main monitor 121 may perform notice display for indicating that the assignment setting processing is performed. For example, in a case where the assignment information T shown in FIG. 8 is used, the main monitor 121 displays the assignment of the functions to the first rear surface function button 127, the second rear surface function button 139, the shutter button 111, the upper surface dial 109, the front dial 113, and the right side surface function button 143. With this, the user can know the function assigned to the operation unit 265 by looking at the display of the main monitor 121. It should be noted that the notice display may be a simple display indicating that the change is made. Further, for the notice display, a combination type of assignment setting processing (for example, "No. 1" in the case of FIG. 8) may be used, a name that can be set for each assignment setting processing (for example, "night indoor imaging") may be used, or these may be used in combination. With this, it is easier for the user to understand the changes. Further, the assignment of respective functions may be displayed. The assignment of respective functions may be displayed in a list, or the assignment setting may be displayed in each part of the appearance of the imaging device displayed graphically. When displaying the assignment of respective functions, all the assignment information may be displayed, or only the changed assignment information may be displayed. The display contents of the notice display may be set by the user, and the notice display makes it easier to understand the display contents.

The examples of the present invention have been described above, but the present invention is not limited to the above-mentioned embodiment, and it goes without saying that various modifications can be made without departing from the gist of the present invention.

EXPLANATION OF REFERENCES

1: imaging device
101: device main body
103: imaging lens
105: lens mount
107: first front surface function button
109: upper surface dial
111: shutter button
113: front dial
115: hot shoe
115a: hot shoe terminal
117: sub monitor
119: electronic viewfinder
121: main monitor
123: eye sensor
125: rear dial
127: first rear surface function button
129: focus lever
131: MENU/OK button
135: display/return button
137: playback button
139: second rear surface function button
143: right side surface function button
145: remote release terminal
151: microphone terminal
153: headphone terminal
155: USB terminal
157: HDMI micro terminal
159: AC adapter terminal
251: imaging element
255: A/D converter
257: digital signal processing unit
259: motion detection sensor
261: orientation detection sensor
263: terminal connection detection unit
265: operation unit
267: memory
269: terminal
271: monitor position detection unit
273: use environment determination unit
275: assignment setting unit
301: CPU

What is claimed is:

1. An imaging device comprising:
a plurality of operation units provided on a plurality of surfaces of a device main body, respectively, and capable of being assigned functions;
a memory that stores assignment information indicating a relationship between a use environment and assignment of the functions to the plurality of operation units;
a motion detection sensor that detects motion of the imaging device; and
a processor configured to perform:
use environment determination processing of determining the use environment of the imaging device; and
assignment setting processing of setting the assignment of the functions to the plurality of operation units based on the assignment information of the memory, according to a result of the use environment determination processing,
wherein the use environment determination processing is performed according to a detection result of the motion detection sensor,
at least one of the operation units is provided on a side surface of the device main body in a case where a surface of the device main body facing an imaging direction is set as a front surface, and
the assignment information stored in the memory defines that a function of adjusting an image quality or an imaging condition is assigned to the at least one of the operation units provided on the side surface in a case where the detection result of the motion detection sensor is a threshold value or less;
wherein at least two of the operation units are provided on an upper surface and a side surface of the device main body in a case where a surface of the device main body facing an imaging direction is set as a front surface, and
the assignment information stored in the memory defines that a function set to one of the at least two operation units provided on the upper surface is transferred to another of the at least two operation units provided on the side surface in a case where the orientation detection sensor detects a vertical shooting orientation of the imaging device.

2. The imaging device according to claim 1, further comprising
an orientation detection sensor that detects an orientation of the imaging device,
wherein the processor performs
the use environment determination processing according to a detection result of the orientation detection sensor.

3. The imaging device according to claim 1, further comprising:
a movable display unit,
wherein the processor detects a direction of a display screen of the display unit, and performs the use environment determination processing based on the direction of the display screen.

4. The imaging device according to claim 3,
wherein the display unit is capable of changing the direction of the display screen in a tilt direction,
at least two of the operation units are provided on a rear surface and an upper surface of the device main body in a case where a surface of the device main body facing an imaging direction is set as a front surface, and
the assignment information stored in the memory defines that a function set to one of the at least two operation units provided on the rear surface is transferred to another of the at least two operation units provided on the upper surface in a case where the display screen faces a direction of the upper surface by a threshold value or more.

5. The imaging device according to claim 3,
wherein the display unit is capable of freely changing the direction of the display screen,
at least four of the operation units are provided on a rear surface, an upper surface, a first side surface, and a second side surface of the device main body in a case where a surface of the device main body facing an imaging direction is set as a front surface, the second side surface being provided on a side opposite to the first side surface, and
the assignment information stored in the memory defines that a function set to one of the at least four operation units provided on the rear surface is transferred to another of the at least four operation units provided on the upper surface, the first side surface, or the second side surface, according to the direction of the display screen.

6. The imaging device according to claim 1,
wherein the processor causes a display unit provided in the device main body to perform notice display for giving notice that the assignment setting processing is performed.

7. The imaging device according to claim 1,
wherein the processor generates and/or edits the assignment information based on an instruction from a user.

8. An imaging device comprising:
a plurality of operation units provided on a plurality of surfaces of a device main body, respectively, and capable of being assigned functions;
a memory that stores assignment information indicating a relationship between a use environment and assignment of the functions to the plurality of operation units;
a connection unit through which a signal is input and/or output; and
a processor configured to perform:
  use environment determination processing of determining the use environment of the imaging device;
  assignment setting processing of setting the assignment of the functions to the plurality of operation units based on the assignment information of the memory, according to a result of the use environment determination processing; and
  connection detection processing of detecting whether or not connection to the connection unit is performed,
wherein the use environment determination processing is performed based on a result of the connection detection processing.

9. The imaging device according to claim 8,
wherein the connection unit is a terminal to which an external device is connectable.

10. The imaging device according to claim 8,
wherein at least one of the operation units is provided on a front surface, which is a surface of the device main body facing an imaging direction,
the connection unit is a first connection unit provided on an upper surface of the device main body, and
the assignment information stored in the memory defines that a recording function is assigned to the at least one of the operation units provided on the front surface in a case where an external device is connected to the first connection unit.

11. The imaging device according to claim 8,
wherein at least one of the operation units is provided on a rear surface of the device main body in a case where a surface of the device main body facing an imaging direction is set as a front surface,
the connection unit is a second connection unit provided on a side surface of the device main body, and
the assignment information stored in the memory defines that a recording function is assigned to the at least one of the operation units provided on the rear surface in a case where an external device is connected to the second connection unit.

12. The imaging device according to claim 8,
wherein the connection unit is a connection unit using wireless communication.

13. The imaging device according to claim 8, further comprising:
a movable display unit,
wherein the processor detects a direction of a display screen of the display unit, and performs the use environment determination processing based on the direction of the display screen.

14. The imaging device according to claim 13,
wherein the display unit is capable of changing the direction of the display screen in a tilt direction,
at least two of the operation units are provided on a rear surface and an upper surface of the device main body in a case where a surface of the device main body facing an imaging direction is set as a front surface, and
the assignment information stored in the memory defines that a function set to one of the at least two operation units provided on the rear surface is transferred to another of the at least two operation units provided on the upper surface in a case where the display screen faces a direction of the upper surface by a threshold value or more.

15. The imaging device according to claim 13,
wherein the display unit is capable of freely changing the direction of the display screen,
at least four of the operation units are provided on a rear surface, an upper surface, a first side surface, and a second side surface of the device main body in a case where a surface of the device main body facing an imaging direction is set as a front surface, the second side surface being provided on a side opposite to the first side surface, and
the assignment information stored in the memory defines that a function set to one of the at least four operation units provided on the rear surface is transferred to another of the at least four operation units provided on the upper surface, the first side surface, or the second side surface, according to the direction of the display screen.

16. The imaging device according to claim 8,
wherein the processor causes a display unit provided in the device main body to perform notice display for giving notice that the assignment setting processing is performed.

17. The imaging device according to claim 8,
wherein the processor generates and/or edits the assignment information based on an instruction from a user.

18. An imaging method using an imaging device which includes a plurality of operation units that are provided on a plurality of surfaces of a device main body, respectively, and that are capable of being assigned functions, a memory that stores assignment information indicating a relationship between a use environment and assignment of the functions to the plurality of operation units, a motion detection sensor that detects motion of the imaging device, and a processor, the imaging method comprising:
a use environment determination processing step of, by the processor, determining the use environment of the imaging device; and
an assignment setting processing step of, by the processor, setting the assignment of the functions to the plurality of operation units based on the assignment information of the memory, according to a result of the use environment determination processing step,
wherein the use environment determination processing step is performed according to a detection result of the motion detection sensor,
at least one of the operation units is provided on a side surface of the device main body in a case where a surface of the device main body facing an imaging direction is set as a front surface, and
the assignment information stored in the memory defines that a function of adjusting an image quality or an imaging condition is assigned to the at least one operation unit provided on the side surface in a case where the detection result of the motion detection sensor is a threshold value or less, wherein at least two of the operation units are provided on an upper surface and a side surface of the device main body in a case where a surface of the device main body facing an imaging direction is set as a front surface, and the assignment information stored in the memory defines that a function set to one of the at least two operation units provided on the upper surface is transferred to another of the at least two operation units provided on the side surface in a case where the orientation detection sensor detects a vertical shooting orientation of the imaging device.

19. A non-transitory, computer-readable tangible storage medium which records thereon a program causing, when read by a computer, the computer to perform the imaging method according to claim 18.

20. An imaging method using an imaging device which includes a plurality of operation units that are provided on a plurality of surfaces of a device main body, respectively, and that are capable of being assigned functions, a memory that stores assignment information indicating a relationship between a use environment and assignment of the functions to the plurality of operation units, a connection unit through which a signal is input and/or output, and a processor, the imaging method comprising:

a use environment determination processing step of, by the processor, determining the use environment of the imaging device;

an assignment setting processing step of, by the processor, setting the assignment of the functions to the plurality of operation units based on the assignment information of the memory, according to a result of the use environment determination processing step; and a connection detection processing step of, by the processor, detecting whether or not connection to the connection unit is performed, and the use environment determination processing step is performed on the basis of a result of the connection detection processing step.

21. A non-transitory, computer-readable tangible storage medium which records thereon a program causing, when read by a computer, the computer to perform the imaging method according to claim 20.

* * * * *